(12) United States Patent
Xue et al.

(10) Patent No.: US 9,339,903 B2
(45) Date of Patent: May 17, 2016

(54) ROTARY DRIVING MECHANISM AND HOLDING DEVICE USING THE SAME

(71) Applicants: FU DING ELECTRONICAL TECHNOLOGY (JIASHAN) CO.,LTD., Zhejiang (CN); HON HAI PRECISION INDUSTRY CO., LTD., New Taipei (TW)

(72) Inventors: Hai-He Xue, Jiashan (CN); Hua Zhang, Jiashan (CN); Hong-Bo Gu, Jiashan (CN); Zhong-Chun Xue, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/591,227

(22) Filed: Jan. 7, 2015

(65) Prior Publication Data
US 2015/0196983 A1   Jul. 16, 2015

(30) Foreign Application Priority Data
Jan. 15, 2014   (CN) .......................... 2014 1 0017553

(51) Int. Cl.
B23Q 1/00     (2006.01)
B23Q 1/54     (2006.01)
B23P 19/04    (2006.01)
B23Q 3/08     (2006.01)
B23Q 5/06     (2006.01)

(52) U.S. Cl.
CPC ............ *B23Q 1/0027* (2013.01); *B23Q 1/5406* (2013.01); *B23Q 3/082* (2013.01); *B23Q 5/06* (2013.01); *B23P 19/04* (2013.01); *B23Q 1/009* (2013.01)

(58) Field of Classification Search
CPC ........ B25B 11/02; B25B 5/061; B23Q 3/152; B23Q 3/08; B23Q 1/44; B23Q 1/009; B23P 19/04
USPC .......................... 269/24–32, 66, 71; 29/281.1
See application file for complete search history.

(56) References Cited

U.S. PATENT DOCUMENTS 4,067,560 A * 1/1978 Arnold ...................... B25B 1/18
                                              269/32
6,024,354 A * 2/2000 Yonezawa ............ B23Q 1/0081
                                              269/309

(Continued)

*Primary Examiner* — Lee D Wilson
*Assistant Examiner* — Seahee Yoon
(74) *Attorney, Agent, or Firm* — Novak Druce Connolly Bove + Quigg LLP (57) ABSTRACT

A rotary driving mechanism includes a support stand, an air feeding assembly, and a driver. The air feeding assembly includes a bearing base, a rotating member, two first ventilating joints, and two second ventilating joints. The bearing base is coupled to the support stand and defines an inner circular surface. The rotating member is rotatably received in the bearing base and resists the inner circular surface. The rotating member defines two circular grooves at an outer periphery thereof and two channels therein. Each circular groove is in fluid communication with one of the channels. The first ventilating joints are coupled to the bearing base and respectively in fluid communication with the circular grooves. The second ventilating joints are coupled to the rotating member and respectively in communication with the channels. The driver is coupled to the rotating member and in communication with the second ventilating joints.

19 Claims, 6 Drawing Sheets

(56) References Cited

U.S. PATENT DOCUMENTS

| | | | |
|---|---|---|---|
| 8,113,557 B2 * | 2/2012 | Kirst | B66C 1/447 294/106 |
| 8,646,822 B2 * | 2/2014 | Braun | H01R 43/20 269/32 |
| 2006/0174760 A1 * | 8/2006 | Rentz | B23Q 3/069 92/33 |
| 2014/0138890 A1 * | 5/2014 | Kawakami | F15B 15/2807 269/27 |
| 2015/0035214 A1 * | 2/2015 | Zhang | B25B 5/061 269/25 |

* cited by examiner

ROTARY DRIVING MECHANISM AND HOLDING DEVICE USING THE SAME

FIELD

The subject matter herein generally relates to holding devices, particularly to a holding device having air tubes and a rotary driving mechanism.

BACKGROUND

When a workpiece is machined, the workpiece can be held by a holding device. The holding device can have a plurality of air tubes to pneumatically drive the workpiece.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a holding device configured to hold and rotate a workpiece. The holding device can include a support stand, an air feeding assembly, and a holding assembly. The air feeding assembly can include a bearing base, a rotating member, two first ventilating joints, and two second ventilating joints. The bearing base can be coupled to the support stand and define an inner circular surface. The rotating member can be rotatably received in the bearing base and resist the inner circular surface. The rotating member can define two circular grooves at an outer periphery thereof and two channels therein. Each circular groove can be in fluid communication with one of the channels. The first ventilating joints can be coupled to the bearing base and respectively in fluid communication with the circular grooves. The second ventilating joints can be coupled to the rotating member and respectively communicate with the channels. The holding assembly can include a driver and a holding member. The driver can be coupled to the rotating member and communicate with the second ventilating joints. The holding member can be coupled to the driver. The driver can be configured to drive the holding member to move. The rotating member can be configured to rotate the holding member.

The present disclosure is further in relation to a rotary driving mechanism can include a support stand, an air feeding assembly, and at least one driver. The air feeding assembly can include a bearing base, a rotating member, two first ventilating joints, and two second ventilating joints. The bearing base can be coupled to the support stand and defines an inner circular surface. The rotating member can be rotatably received in the bearing base and resist the inner circular surface. The rotating member can define two circular grooves at an outer periphery thereof and two channels therein. Each circular groove can be in fluid communication with one of the channels. The first ventilating joints can be coupled to the bearing base and respectively in fluid communication with the circular grooves. The second ventilating joints can be coupled to the rotating member and respectively communicate with the channels. The at least one driver can be coupled to the rotating member and communicate with the second ventilating joints.

Figure 1:
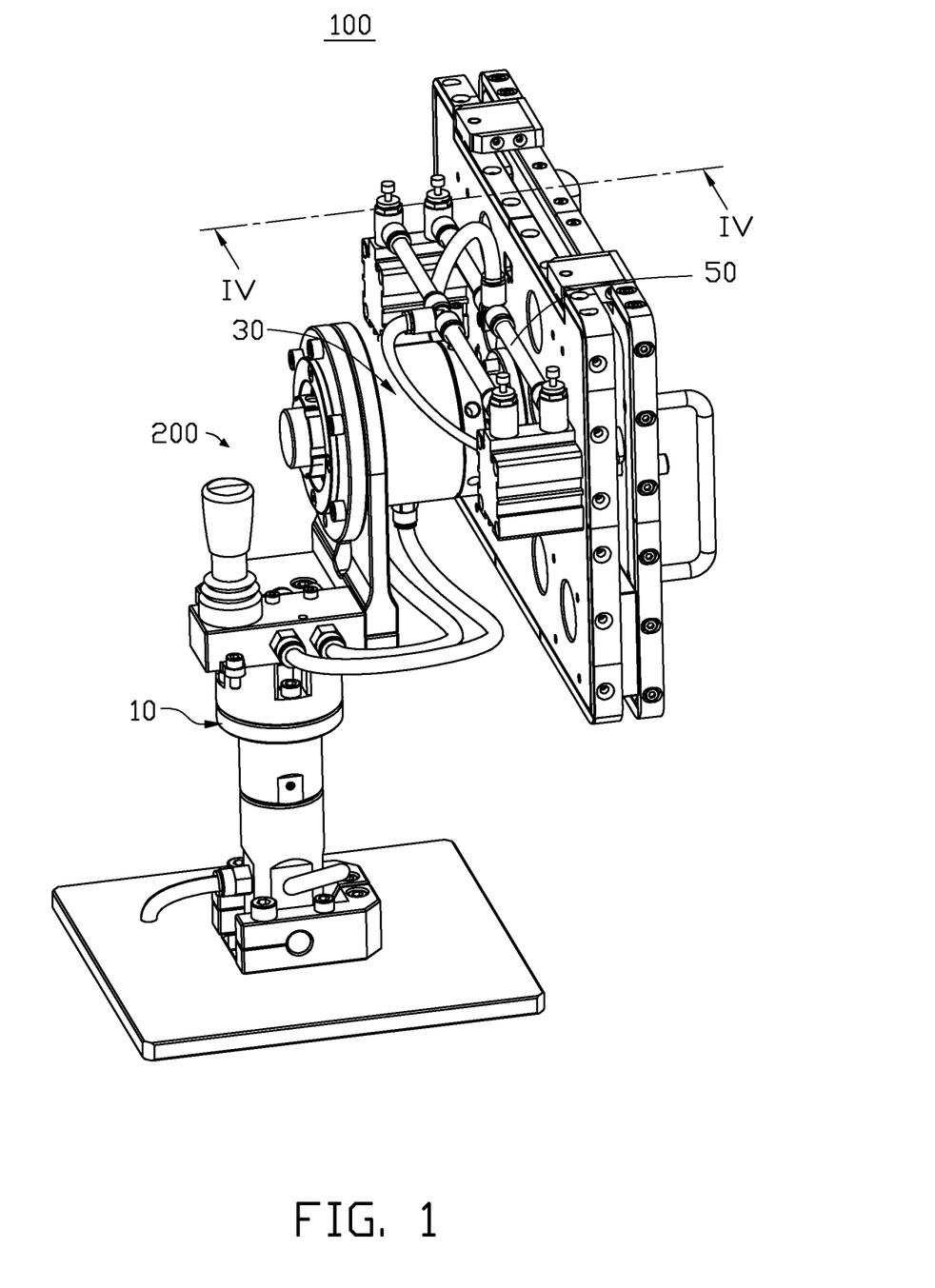
FIG. 1 is an isometric view of an embodiment of a holding device including a holding assembly and a rotating member.

FIG. 1 illustrates that an embodiment of a holding device 100 configured to hold and rotate a workpiece in convenient for processing different surfaces of the workpiece. The holding device 100 can include a support stand 10, an air feeding assembly 30, and a holding assembly 50. The air feeding assembly 30 can be mounted on the support stand 10. The holding assembly 50 can be coupled to the air feeding assembly 30 at an end away from the support stand 10. The air feeding assembly 30 can be configured to transmit gas or air from the support stand 10 to the holding assembly 50, to enable the holding assembly 50 holding the workpiece.

Figure 2:
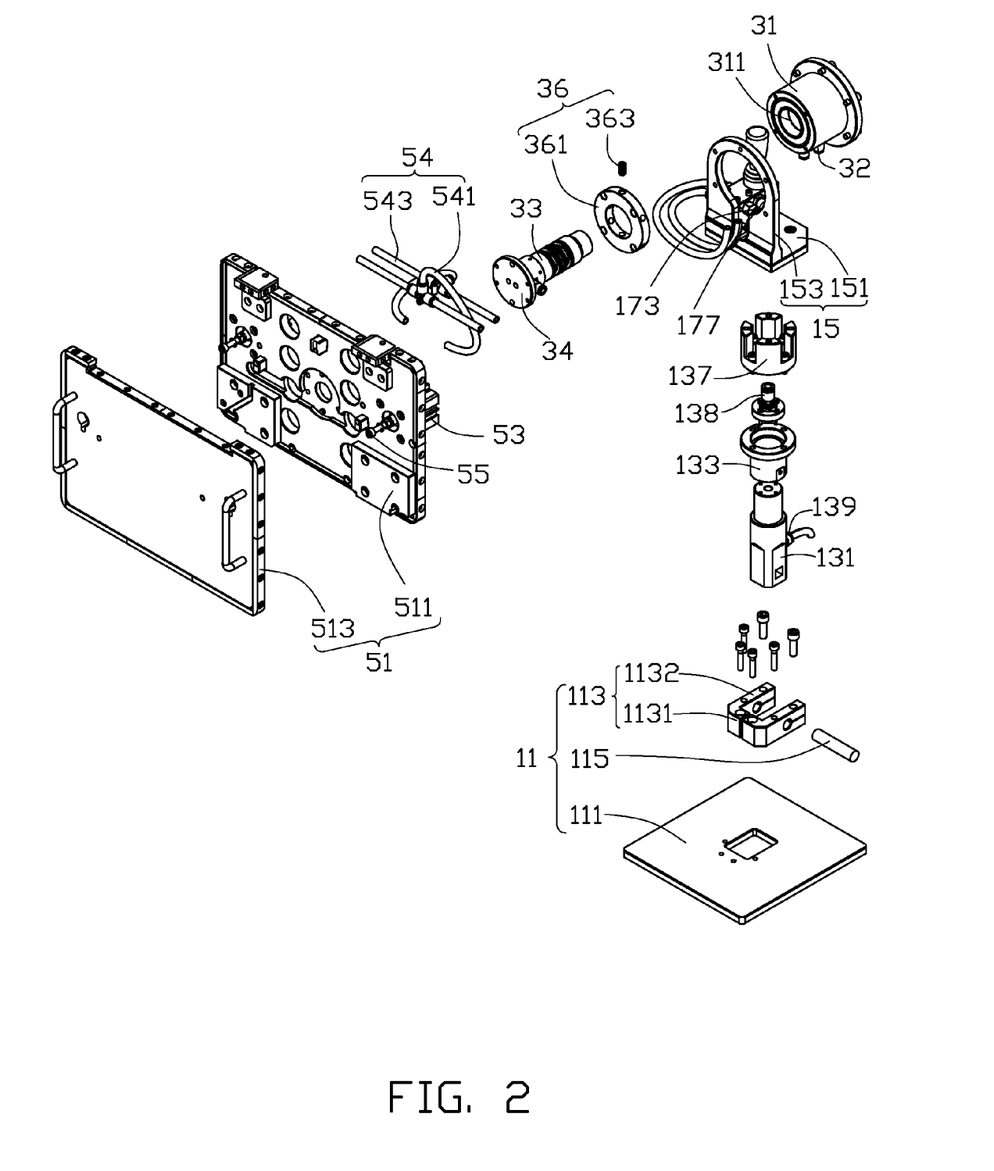
FIG. 2 is an exploded, isometric view of the holding device of FIG. 1.
Figure 3:
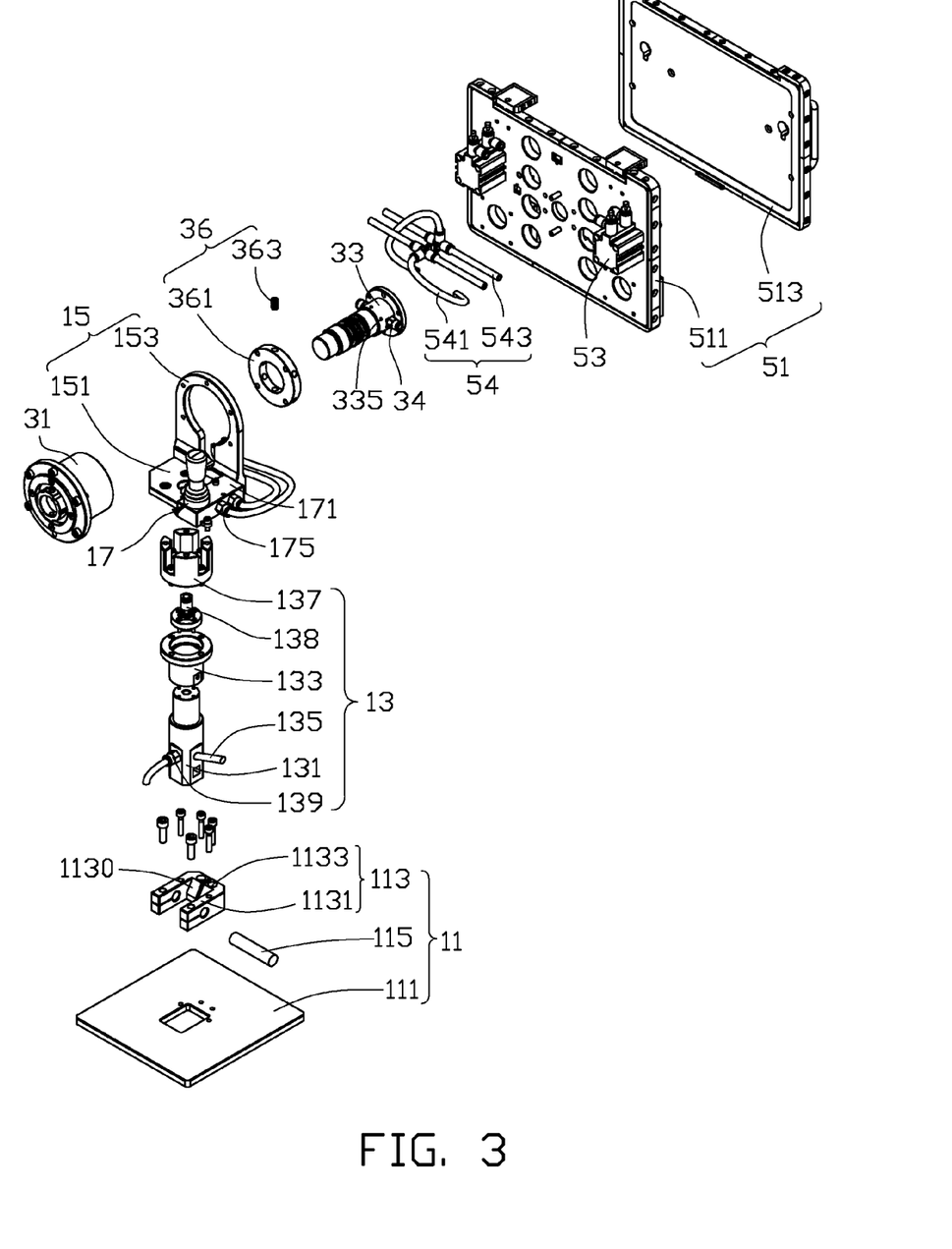
FIG. 3 is similar to FIG. 2, but shown in another angle.

FIGS. 2 and 3 illustrate that the support stand 10 can include a mounting assembly 11, a rotating assembly 13, a fixing member 15, and a switch 17. The mounting assembly 11 can include a base 111, two mounting members 113 opposite each other, and a coupling rod 115. The mounting members 113 can be mounted on the base 111. Each mounting member 113 can include a main body 1131 and a protruding portion 1133 protruding from an end portion of the main body 1131. The main body 1131 can be substantially cuboid shaped. The main bodies 1131 of the two mounting members 113 can be positioned face to face. The protruding portions 1133 can be positioned between the main bodies 1131. Each protruding portion 1133 can define a positioning bevel 1130. In the illustrated embodiment, an included angle between the positioning bevel 1130 and a top of the protruding portion 1133 can be 135 degrees. Opposite ends of the coupling rod 115 can be respectively rotatably inserted through the main bodies 1131.

The rotating assembly 13 can include a rotatable member 131, a rotating sleeve 133, a limiting member 135, a coupling member 137, a rotation joint 138, and a coupling joint 139.

Figure 4:
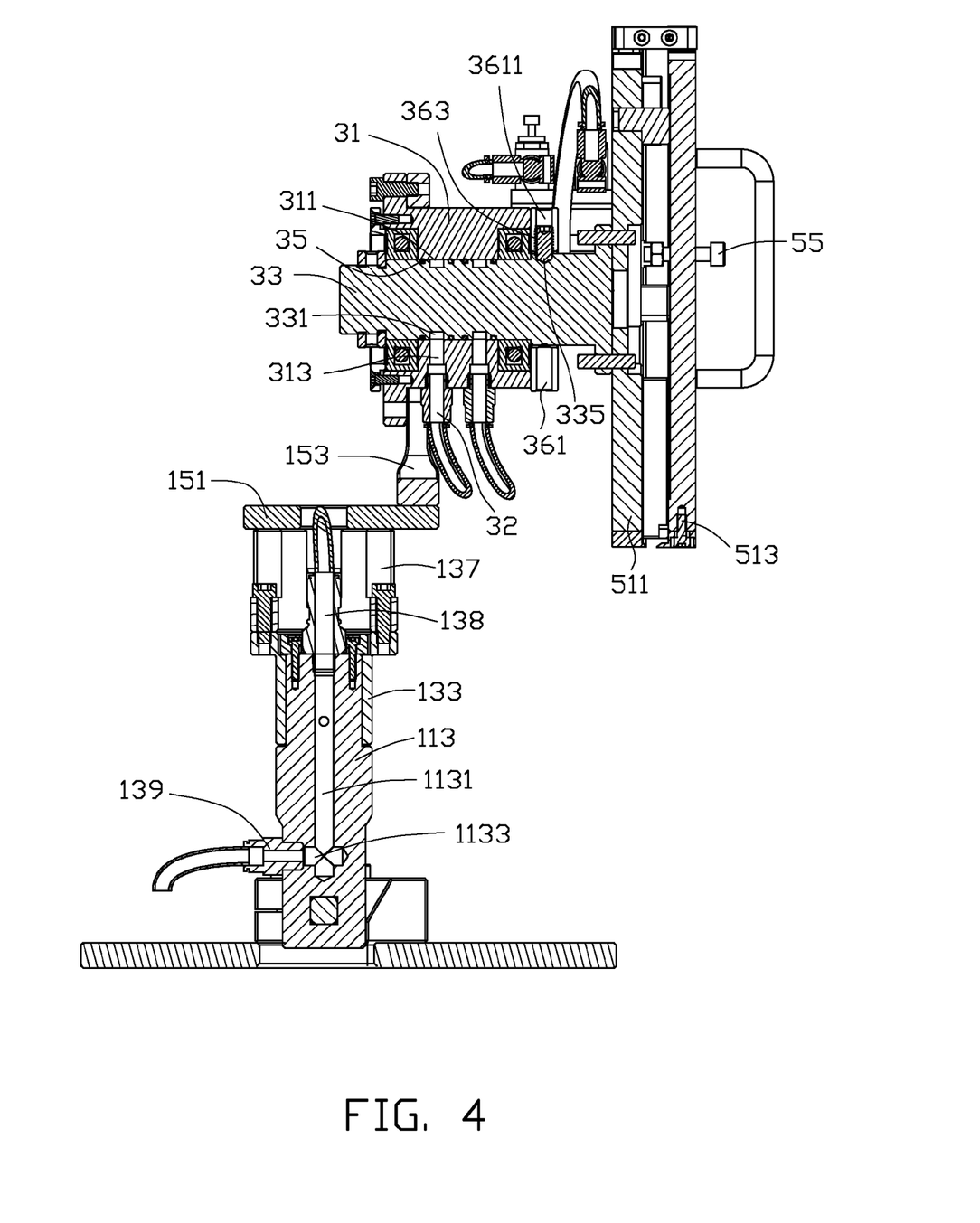
FIG. 4 is a cross-sectional view of the holding device of FIG. 1, taken along line IV-IV.

The rotatable member 131 can be substantially cylindrical. A first end portion of the rotatable member 131 can be located between the main bodies 1131 and rotatably coupled to the coupling rod 115. The rotatable member 131 can rotate about the coupling member 115. FIG. 4 illustrates that the rotatable member 131 can define a passage 1311 along an axis thereof. The first end portion of the rotatable member 131 can define a first receiving hole 1313. The first receiving hole 1313 can be substantially perpendicular to the passage 1311 and in fluid communication with the passage 1311. The first receiving hole 1313 can be configured to receive the coupling joint 139.

The rotating sleeve 133 can be substantially hollow and cylindrical. The rotating sleeve 133 can be sleeved on a second end portion of the rotatable member 131 opposite the first end portion. The limiting member 135 can be coupled to the first end of the rotatable member 131 adjacent to the main body 1131. The limiting member 135 can be configured to limit a rotating angle of the rotatable member 131 around the coupling rod 115.

The coupling member 137 can be hollow and coupled to the rotating sleeve 133. The rotation joint 138 can be coupled to a second end of the rotatable member 131 opposite the first end and in fluid communication with the passage 1311. The rotation joint 138 can be partly received in the coupling member 137. The coupling joint 139 can be inserted into the first receiving hole 1313 and in fluid communication with the passage 1311.

The fixing member 15 can be L-shaped. The fixing member 15 can include a fixing portion 151 and a supporting portion 153. The fixing portion 151 can be substantially a board. The fixing portion 151 can be mounted on the coupling member 137. The supporting portion 153 can be substantially a board. The supporting portion 153 can be coupled to an edge of the fixing portion 151 and substantially perpendicular to the fixing portion 151. The supporting portion 153 can be positioned at a side of the fixing portion 151 away from the coupling member 137.

Figure 5:
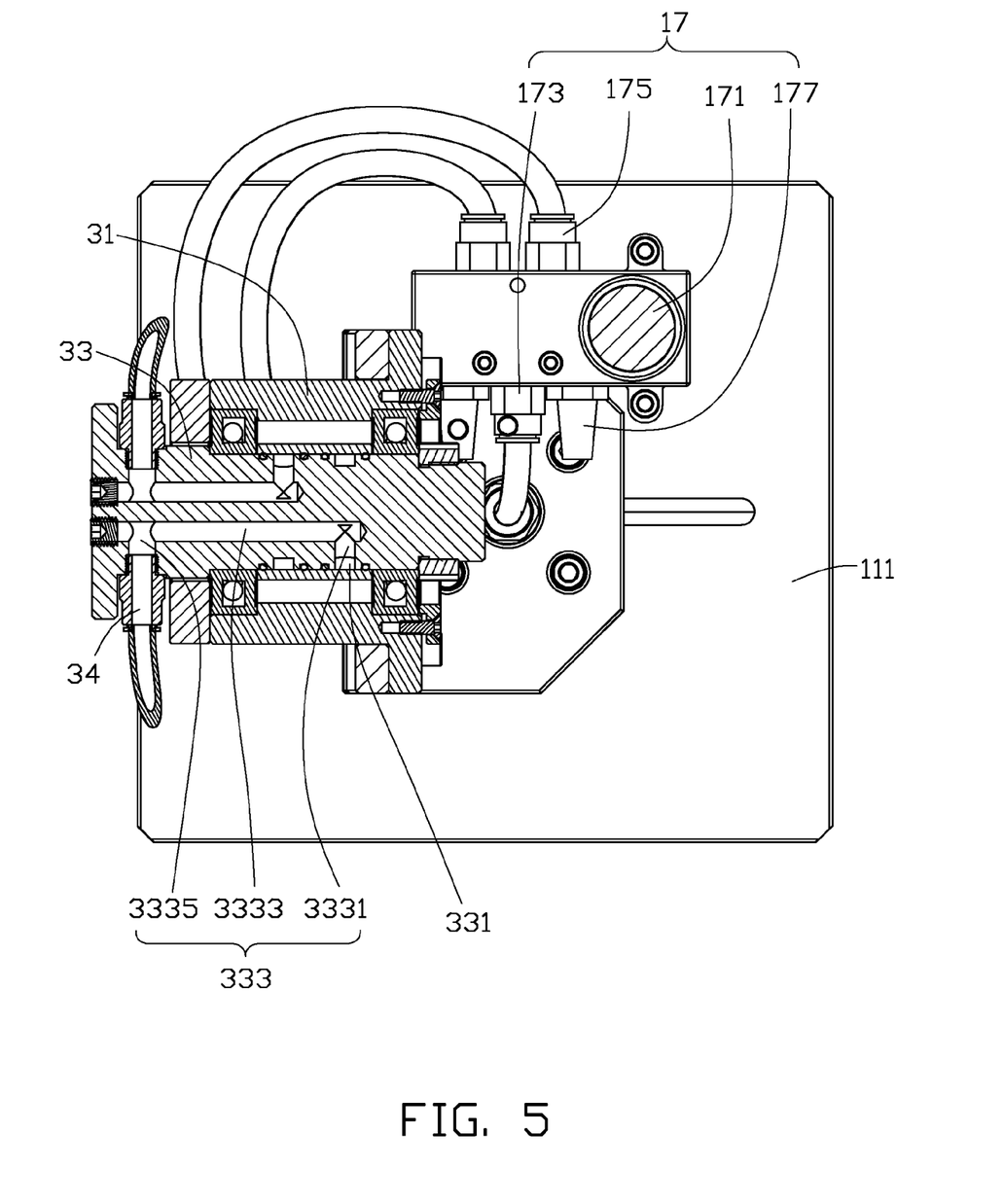
FIG. 5 is a cross-sectional view of the holding device without the holding assembly of FIG. 4, taken along line V-V.

The switch 17 can be mounted on the fixing portion 151. FIG. 5 illustrates that the switch 17 can include a manual valve 171, an air inlet joint 173, two air outlet joints 175, and two mufflers 177. The manual valve 171 can be coupled to the fixing portion 151. The air inlet joint 173, the air outlet joints 175, and the mufflers 177 can be coupled to the manual valve 171. The air inlet joint 173 can be positioned between the two mufflers 177 and in fluid communication with the rotation joint 138. The air inlet joint 173 and the air outlet joints 175 can be located at opposite sides of the manual valve 171. The air inlet joint 173 can alternatively communicate with either one of the air outlet joints 175 via the manual valve 171. The mufflers 177 can be configured to decrease a noise when in use.

The air feeding assembly 30 can be coupled to the supporting portion 153. The air feeding assembly 30 can include a bearing base 31, two first ventilating joints 32, a rotating member 33, two second ventilating joints 34, four sealing members 35, and an positioning member 36. The bearing base 31 can be coupled to the supporting portion 153. The bearing base 31 can be substantially cylindrical and hollow. The bearing base 31 can define an inner circular surface 311. The bearing base 31 can define two second receiving holes 313 (shown in FIG. 4) along a radial direction of the bearing base 31. The second receiving holes 313 can run through the inner circular surface 311.

Each first ventilating joint 32 can be coupled to one of the second receiving holes 313 and be fluid communication with an inner of the bearing base 31. A first end of each first ventilating joint 32 can be received in the second receiving hole 313 and seal the second receiving hole 313. A second end of each first ventilating joint 32 can be coupled to one of the air outlet joints 175 and in fluid communication with the corresponding air outlet joint 175.

Figure 6:
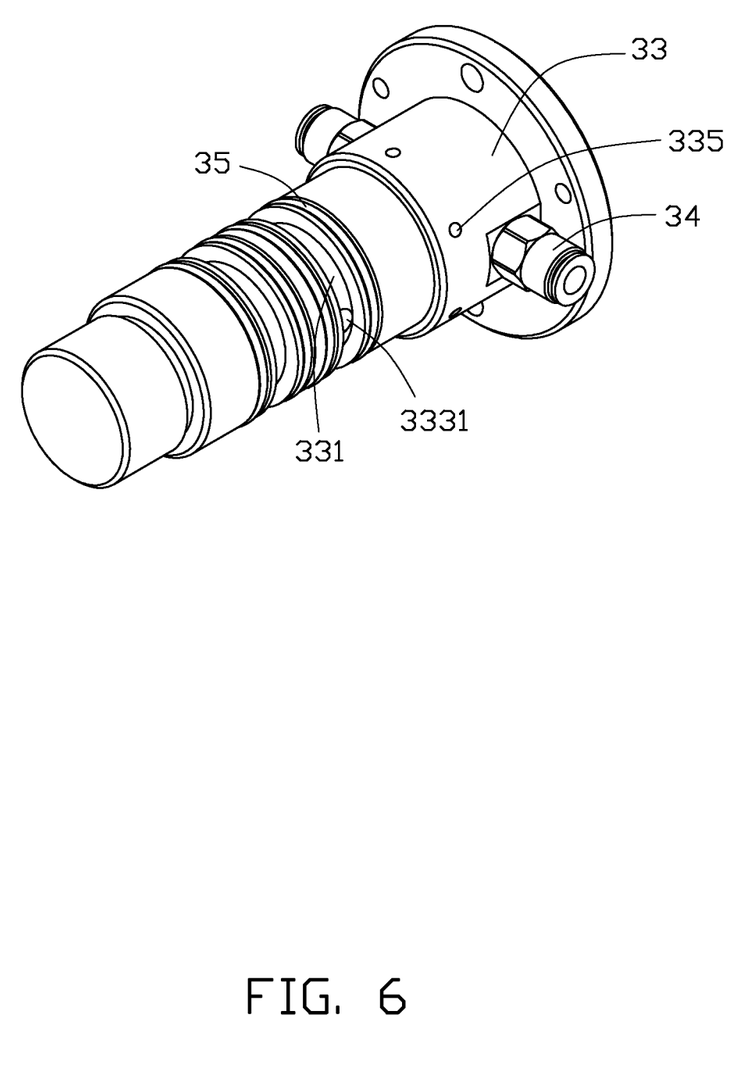
FIG. 6 is an enlarged, isometric view of the rotating member of FIG. 3.

The rotating member 33 can be substantially cylindrical and rotatably received in the bearing base 31. A first end of the rotating member 33 can rotatably pass through the bearing base 31 and resist the inner circular surface 311. FIG. 6 illustrates that the rotating member 33 can define two circular grooves 331 at an outer periphery thereof.

The rotating member 33 can further define two channels 333 therein. Each circular groove 331 can be in fluid communication with one of the channels 333 and one of the second receiving holes 313. Each channel 333 can include a communicating hole 3331, a blowhole 3333, and an accepting hole 3335. The communicating hole 3331 can be positioned along a radial direction of the rotating member 33 and communicate with the corresponding circular groove 331. The accepting hole 3335 can be substantially parallel to the communicating hole 3331 and run through an outer surface of the rotating member 33. The blowhole 3333 can be in fluid communication with the communicating hole 3331 and the accepting hole 3335 and positioned between the communicating hole 3331 and the accepting hole 3335. The blowhole 3333 can be positioned along a longitudinal direction of the rotating member 33.

A second end of the rotating member 33 opposite the first end can define a plurality of mounting holes 335. The mounting holes 335 can be arranged around the outer surface of the rotating member 33 and evenly spaced from each other. In the illustrated embodiment, a number of the mounting holes 335 can be six. An included angle of two adjacent mounting holes 335 can be substantially 60 degrees. Each second ventilating joint 34 can be received in one of the accepting holes 3335 and seal the accepting hole 3335. Four sealing members 35 can be separately sleeved on the rotating member 33. Each two of the sealing members 35 can be positioned at opposite sides of one of the circular grooves 331 and resist against the inner circular surface 311. Thus, each circular groove 311 is sealed by two sealing members 35.

The positioning member 36 can include a ring 361 and a latching pin 363. The ring 361 can be sleeved on the second end of the rotating member 33 away from the bearing base 31. The ring 361 can be coupled to the bearing base 31. The ring 361 can define a plurality of through holes 3611. The latching pins 363 can be respectively detachably received in the through holes 3611 and inserted into the mounting holes 335, to stop a rotation of the rotating member 33.

The holding assembly 50 can include a mounting bracket 51, two drivers 53, two coupling pipes 54, and two holding members 55. The mounting bracket 51 can be coupled to the second end of the rotating member 33. The mounting bracket 51 can be configured to support the workpiece. The mounting bracket 51 can include a first mounting plate 511 and a second mounting plate 513 coupled to the first mounting plate 511. The drivers 53 can be coupled to the first mounting plate 511 and positioned at a side of the first mounting plate 511 adjacent to the rotating member 33.

Each coupling pipe 54 can include a flexible tube 541 and two coupling tubes 543 in fluid communication with the flexible tube 541. The coupling tubes 543 and the flexible tube 541 can be coupled to a T-joint. Each flexible tube 541 can be coupled to one of the second ventilating joints 34. The coupling tubes 543 of one coupling pipe 54 can be respectively coupled to air inlets of the drivers 53. The coupling tubes 543 of another coupling pipe 54 can be respectively coupled to air outlets of the drivers 53.

Each holding member 55 can be coupled to one of the drivers 53 and movably inserted through the first mounting plate 511 and the second mounting plate 513. The drivers 53 can drive the holding members 55 to pass through the first mounting plate 511 and the second mounting plate 513 to position a workpiece positioned between the first mounting plate 511 and the second mounting plate 513 or a workpiece positioned on the second mounting plate 513. In the illustrated embodiment, the drivers 53 are air cylinders.

When in assembly, the mounting members 113 can be fixed to the base 111. The rotatable member 131 can be positioned between the main bodies 1131. The coupling rod 115 can be inserted into the main bodies 1131 and the rotatable member 131. The rotating sleeve 133 can be sleeved on the rotatable member 131. The rotation joint 138 can be coupled to the rotatable member 131. The coupling member 137 can be coupled to the rotating sleeve 133 and the rotation joint 138 can be received in the coupling member 137. The fixing member 15 can be coupled to the coupling member 137. The switch 17 can be coupled to the fixing portion 151. The bearing base 31 can be coupled to the supporting portion 153. The first ventilating joints 32 can be received in the corresponding second receiving hole 313 and communicate with the corresponding air outlet joint 175.

The rotating member 33 can be received in the bearing base 31 and resist the inner circular surface 311. The circular groove 331 can be fluid communication with the corresponding second receiving hole 313. The second ventilating joints 34 can be received in the accepting holes 3335. The drivers 53 can be coupled to the mounting bracket 51 and the holding members 55 can be coupled to the drivers 53. The mounting bracket 51 can be coupled to the rotating member 33. The coupling tubes 543 of one coupling pipe 54 can be respectively coupled to air inlets of the drivers 53. The coupling tubes 543 of another coupling pipe 54 can be respectively coupled to air outlets of the drivers 53.

When in use, the rotatable member 131 can rotate a determined angle and then the mounting bracket 51 can be positioned at a needed angle. The limiting member 135 can limit a movement of the rotatable member 131 to lock the holding device 100. Air from an outer air source can be charged into the air inlet joint 173 via the coupling joint 139, the passage 1131, and the rotation joint 138. The manual valve 171 can control the air to enter one of the first ventilating joint 32 via the corresponding air outlet joint 175. The air further can enter into the drivers 53 via the circular groove 331, the channel 333, and the second ventilating joint 34. Thus, the drivers 53 can drive the holding member 55 to hold the workpiece and position the workpiece in a proper position to be machined. When a surface of the workpiece is machined, the latching pins 363 can be pulled out. The rotating member 33 can rotate the workpiece in a determined angle. Then, the latching pins 363 can be inserted into the mounting holes 335 again, to lock the rotating member 33 again. Thus, another surface of the workpiece can be machined. When the machining of the workpiece is done, the air source can stop to supply air. The drivers 53 can recover back to an original state to release the workpiece. Air in the drivers 53 can be discharged via the second ventilating joint 34, the channel 333, the first ventilating joint 32, and the air outlet joint 175.

In at least one embodiment, an included angle between the positioning bevel 1130 and a top of the protruding portion 1133 can be not limited to 135 degrees and can be in the range of 90-180 degrees. A number of the mounting holes 335 can be at least two. A number of the drivers 53 can be at least two. When there are more than two drivers 53, the coupling tubes 543 can be more than two. The driver 53 can be not limited to air cylinder. The driver 53 can be vacuum sucker. The support stand 10, the air feeding assembly 30, the supporting bracket 51, and the drivers 53 can define a rotary driving mechanism 200. The holding members 55 can be omitted or replaced to other members, such as cutters.

The embodiments shown and described above are only examples. Many details are often found in the art such as the other features of a holding device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A holding device configured to hold and rotate a workpiece, the holding device comprising:
   a support stand;
   an air feeding assembly comprising:
      a bearing base coupled to the support stand and defining an inner circular surface,
      a rotating member rotatably received in the bearing base in resistance with the inner circular surface, the rotating member having two circular grooves at an outer periphery thereof and two channels defined therein, each circular groove being in fluid communication with at least one of the channels,
      two first ventilating joints coupled to the bearing base and respectively in fluid communication with the circular grooves, and
      two second ventilating joints coupled to the rotating member and respectively in fluid communication with the channels; and
   a holding assembly comprising:
      a driver coupled to the rotating member and communicating with the second ventilating joints, and
      a holding member coupled to the driver;
   wherein the driver is configured to drive the holding member to move, and the rotating member is configured to rotate the holding member.

2. The holding device of claim 1, wherein the rotating member defines a mounting hole, the air feeding assembly further comprises a positioning member, the positioning member comprises a ring and a latching pin, the ring is sleeved on the rotating member, the ring defines a through hole, the latching pins is detachably received in the through holes and the mounting holes, to lock the rotating member.

3. The holding device of claim 1, wherein the air feeding assembly further comprises four sealing members separately sleeved on the rotating member, each two of the sealing members are positioned at opposite sides of one of the circular grooves and resist the inner circular surface.

4. The holding device of claim 1, wherein the holding assembly further comprises a mounting bracket and two coupling pipes, the mounting bracket is coupled to the rotating member, the driver is mounted on the mounting bracket, each coupling pipe comprises a flexible tube and a coupling tube in fluid communication with the flexible tube, the flexible tube is coupled to one of the second ventilating joints, the coupling tube is coupled to the driver.

5. The holding device of claim 1, wherein the support stand comprises a mounting assembly, a rotatable assembly, a fixing member, and a switch, the rotatable assembly is rotatably coupled to the mounting assembly, the fixing member is coupled to the rotatable assembly, the bearing base is mounted on the fixing member, the switch is coupled to the fixing member and comprises a manual valve, an air inlet joint, two air outlet joints, and two mufflers, the air let joint and the outlet joints are in fluid communication with the manual valve, the mufflers is coupled to the manual valve, the air outlet joints are respectively in fluid communication with the first ventilating joints.

6. The holding device of claim 5, wherein the rotatable assembly comprises a rotatable member and a coupling joint, the rotatable member is rotatably coupled to the mounting assembly, the rotatable member defines a passage along an axis thereof, the passage is in fluid communication with the air inlet joint, the coupling joint is coupled to the rotatable member and in fluid communication with the passage.

7. The holding device of claim 6, wherein the rotatable assembly further comprises a coupling member and a rotation joint, the coupling member is substantially hollow and coupled to the rotatable member, the rotation joint can be partly received in the coupling member and communicate with the passage, the air inlet joint is in fluid communication with the rotation joint.

8. The holding device of claim 6, wherein the mounting assembly comprises a base, two mounting members opposite each other, and a coupling rod, each mounting member comprises a main body and a protruding portion protruding from an end portion of the main body, the main bodies of the mounting members are positioned face to face, the protruding portions are positioned between the main bodies, each protruding portion defines a positioning bevel, the coupling rod is respectively rotatably inserted through the main bodies and the rotatable member.

9. The holding device of claim 6, wherein the rotatable member defines a first receiving hole communicating with the passage, the coupling joint is inserted into the first receiving hole.

10. The holding device of claim 1, wherein each channel comprises a communicating hole, a blowhole, and an accepting hole, the communicating hole is positioned along a radial direction of the rotating member and in fluid communication with the corresponding circular groove, the accepting hole is substantially parallel to the communicating hole, the blowhole is in fluid communication with the communicating hole and the accepting hole and positioned between the communicating hole and the accepting hole, the blowhole is positioned along a longitudinal direction of the rotating member, the second ventilating joints are respectively received in the accepting holes of the channels.

11. A rotary driving mechanism comprising:
a support stand;
an air feeding assembly comprising:
    a bearing base coupled to the support stand and defining an inner circular surface,
    a rotating member rotatably received in the bearing base in resistance with the inner circular surface, the rotating member having two circular grooves at an outer periphery thereof and two channels defined therein, each circular groove being in fluid communication with one of the channels,
    two first ventilating joints coupled to the bearing base and respectively in fluid communication with the circular grooves, and
    two second ventilating joints coupled to the rotating member and respectively in fluid communication with the channels; and
at least one driver coupled to the rotating member and communicating with the second ventilating joints.

12. The rotary driving mechanism of claim 11, wherein the rotating member defines a mounting hole, the air feeding assembly further comprises a positioning member, the positioning member comprises a ring and a latching pin, the ring is sleeved on the rotating member, the ring defines a through hole, the latching pins is detachably received in the through holes and the mounting holes, to lock the rotating member.

13. The rotary driving mechanism of claim 11, wherein the air feeding assembly further comprises four sealing members separately sleeved on the rotating member, each two of the sealing members are positioned at opposite sides of one of the circular grooves and resist the inner circular surface.

14. The rotary driving mechanism of claim 11, further comprising:
a mounting bracket coupled to the rotating member, the driver mounted on the mounting bracket, and
two coupling pipes, each coupling pipe comprising a flexible tube and a coupling tube in fluid communication with the flexible tube, the flexible tube coupled to one of the second ventilating joints, the coupling tube coupled to the driver.

15. The rotary driving mechanism of claim 11, wherein the support stand comprises a mounting assembly, a rotatable assembly, a fixing member, and a switch, the rotatable assembly is rotatably coupled to the mounting assembly, the fixing member is coupled to the rotatable assembly, the bearing base is mounted on the fixing member, the switch is coupled to the fixing member and comprises a manual valve, an air inlet joint, two air outlet joints, and two mufflers, the air let joint and the outlet joints are in fluid communication with the manual valve, the mufflers is coupled to the manual valve, the air outlet joints are respectively in fluid communication with the first ventilating joints.

16. The rotary driving mechanism of claim 15, wherein the rotatable assembly comprises a rotatable member and a coupling joint, the rotatable member is rotatably coupled to the mounting assembly, the rotatable member defines a passage along an axis thereof, the passage is in fluid communication with the air inlet joint, the coupling joint is coupled to the rotatable member and communicate with the passage.

17. The rotary driving mechanism of claim 16, wherein the mounting assembly comprises a base, two mounting members opposite each other, and a coupling rod, each mounting member comprises a main body and a protruding portion protruding from an end portion of the main body, the main bodies of the mounting members are positioned face to face, the protruding portions are positioned between the main bodies, each protruding portion defines a positioning bevel, the coupling rod is respectively rotatably inserted through the main bodies and the rotatable member.

18. The rotary driving mechanism of claim 16, wherein the rotatable member defines a first receiving hole communicating with the passage, the coupling joint is inserted into the first receiving hole.

19. The rotary driving mechanism of claim 11, wherein each channel comprises a communicating hole, a blowhole, and an accepting hole, the communicating hole is positioned along a radial direction of the rotating member and in fluid communication with the corresponding circular groove, the accepting hole is substantially parallel to the communicating hole, the blowhole is in fluid communication with the communicating hole and the accepting hole and positioned between the communicating hole and the accepting hole, the blowhole is positioned along a longitudinal direction of the rotating member, the second ventilating joints are respectively received in the accepting holes of the channels.

\* \* \* \* \*